(12) United States Patent
Currier

(10) Patent No.: X8842
(45) Date of Patent: May 29, 1835

(54) EXCAVATING & REMOVING EARTH

(76) Inventor: Nathan Currier

Nathan Currier Methuen Mass
Letters Patent

The schedule referred to in these Letters Patent and making part of the
same containing a description in the words of the said Nathan Currier himself
of his improvement in a machine to excavate and remove earth.

To all to whom these presents shall come Be it known that I Nathan Currier of
Methuen in the County of Essex and Commonwealth of Massachusetts have
invented a new and useful improvement in a machine to excavate and
remove earth: and that the following is a full and exact description thereof.
The frame of the carriage is placed on four wheels and may be from eight to
sixteen feet long. and from four to six feet wide as may be most convenient
The front wheels are fastened with a bolt or swivel so they can turn each way
under the carriage the front part of which being curved for that purpose.
The front wheels are about two feet in height & the others from two and an half
to three feet The frame is composed of four sticks of timber two side pieces some
what similar to those of an ox waggon but not straight, one cross piece called
the rocker resting on the front axle tree, and one on the hind axle tree. The
timber is of sufficient size to support the spades. The front part may have a
box to carry tools &c. The frame of the carriages may contain one two
or three spades as is most convenient. The spade is somewhat similar in
form to the common scraper it is about four feet in length and can be raised
according to the carriage. It is fastened to the carriage with bolts or swiv-
-els with nuts or keys passing thro, the sides of the spades near the hind
end and through the frame in such manner as to allow the spade to drop
down or the spade to turn over. where the bolts and swivels pass through the
spade and frame, there are two straps of iron. one round the spade and
one round the frame to support them and keep them in their place.
The depth of the spade is equal to about one third of its length. It is
made of wood iron and steel, on each side of the spade near the front
is a semicircular piece of wood about two thirds of the length of the spade + about one half the depth. They are fastened to the Spade by iron straps
and a bar in the centre which passes up through the cross bar, that lead
from one side of the carriage to the other) and is fastened by keys or pins
The front part of the Spade is connected by chains, running almost per
=pendicular and fastened to a roller of wood or iron so as to raise or sink
the Spade at pleasure and to prevent it from turning under. For the purpose
of loading the Spade the keys or pins are removed from the centre bar which
passes through the cross bar and the front edge of the spade drops immediate
=ly to the ground. the team is then moved till the Spade fills. it is then
elevated to its proper place by means of a lever or pullies & is there confined
by the keys or pins. The chains are then unfastened and the team driven
to the place where it is to be unloaded, and by a lever and hook or pullies
it is then turned over. The back cross bars rest on blocks of wood placed on
the frame of the carriage of sufficient thickness to raise the hind part to
the same height as the front curved part. All your Petitioner claims as
his own invention and not previously patented in the above described Ma
=chine is the form of hanging and arranging the spades, together with
the manner of turning them over to unload. He also contemplates alter
=ing parts of the frame to attach the rollers or pullies so that it may be used
in removing earth in deep water Witnesses
Nathl Marsh
John Varnum Nathan Currier Exd.
W.G.

[733 [illegible]